3,790,498
MEMORY LIQUID CRYSTAL COMPOSITIONS
Yoshio Katagiri and Yoshio Miyata, Sendai, Japan, assignors to Kabushiki Kaisha Daini Seikosha, and Kabushiki Kaisha Seikosha, both of Tokyo, Japan
No Drawing. Filed Nov. 22, 1971, Ser. No. 201,215
Claims priority, application Japan, Dec. 28, 1970, 46/120,048
Int. Cl. C02f 1/16
U.S. Cl. 252—408                     6 Claims

ABSTRACT OF THE DISCLOSURE

Memory liquid crystal compositions containing from 80–95% by weight of one or more nematic crystal liquid compounds of the formula

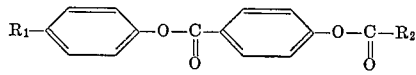

wherein $R_1$ and $R_2$ are alkyl and alkoxy and may be the same or different, and 5–20% by weight of a carboxylic acid ester of cholesterol, sitosterol or stigmasterol are useful in display devices at room temperature.

---

This invention relates to liquid crystals. More particularly, it relates to memory liquid crystal compositions for use in display devices.

Liquid crystals are generally classified as smectic, nematic, and cholesteric. The smectic phase shows a layered structure. Within a given layer, the molecules are parallel to one another and may be perpendicular or slightly inclined to the plane of the layers. Each stratum is one, or at most, a few molecules thick. In the nematic phase, the molecules are constrained to be parallel, but they are not separated into layers. The centers of gravity of the molecules are randomly placed. In the cholesteric phase the molecules are thought to be arranged in thin layers, with the long axes of the molecules parallel to the plane of the layers. Within a given layer the structure is reminiscent of the nematic phase, but the direction of the long axes in each layer is displaced slightly from the corresponding direction in the next layer, thereby giving the appearance of a "twisted nematic" structure.

Liquid crystal research has led to the discovery of new electro-optic effects in nematic liquid crystals and mixtures of nematic and cholesteric liquid crystals. As a result of this research liquid crystalline materials have been developed to apply these effects to use in display devices.

The basic cell used in the construction of display deveices that exhibit electro-optic effects consists of a parallel plate capacitor with liquid crystalline material acting as the di-electric. The plates are two pieces of glass, each having a thin conductive coating, such as tin oxide. In fabrication a drop of the liquid crystalline compound is placed on one of the plates and a sandwich is formed by placing another plate over it. The thickness of the active area is generally in the range of six to 25 microns.

When such cell is made with a nematic liquid crystal as the dielectric, the resulting panel is transparent. On applying a D.C. or low frequency A.C. signal across the plates the material changes into a milky white liquid which produces light scattering. When the electric field is removed, the panel returns to its transparent state.

Mixtures composed of nematic liquid crystals of the dynamic scattering type and a small amount of cholesteric liquid crystals produce another electro-optical effect, the reflective optical storage mode, when they are used as the dielectric in the cell. The initially transparent or slightly turbid panel becomes milky white, similar in appearance to the dynamic scattering mode when subjected to a D.C. or low frequency A.C. signal. In contrast to dynamic scattering, however, this highly scattering appearance remains after the electrical excitation is removed. The transparent state can be abruptly restored by applying an A.C. signal in the kilo-hertz range.

These mixtures of nematic and cholesteric liquid crystals have been termed memory liquid crystals.

This property of memory liquid crystals has made them useful in display devices which require little use of electric power. By use of these memory liquid crystal compositions, a memory panel may be constructed without the use of expensive electronic equipment.

The memory liquid crystals composed of cholesteric and nematic liquid crystals are the commonly used memory liquid compositions. An example of such composition is a mixture containing 10% by weight of cholesteryl nonanoate, a cholesteric liquid crystal compound, and 90% by weight of anisylidene-p-amino-phenyl acetate, a nematic liquid crystal compound. The temperature range over which this composition functions is from about 77–97° C. Such memory liquid crystal compositions cannot be used at room temperature, and heating devices are needed to raise the temperature at which these compositions can be used. Furthermore at higher temperatures these compositions of organic compounds are slowly decomposed by interaction with the atmosphere, particularly the oxygen.

SUMMARY OF THE INVENTION

It is the object of the present invention to provide a stable memory liquid crystal composition which functions at room temperature and which is readily adapted for use in display devices.

Other objects and advantages of the present invention will be apparent from the description which follows.

In accordance with the present invention there is provided a memory liquid crystal composition containing a mixture of nematic liquid crystals and cholesteric liquid crystals, which mixture functions at room temperature. This mixture consists of from about 5 to 20% by weight of cholesteric liquid crystals and from about 80–95% by weight of nematic liquid crystals.

In accordance with the present invention the concentration range of the cholesteric crystals is preferably 5–20 weight percent. When it is less than 5 percent, the light scattering is rapidly diminished and the composition goes back to the transparent state upon the elimination of the electric field. When it is more than 20 percent, it has been found unsuitable for the use for the following reasons.

(1) High voltage power supply is needed for appearance and disappearance of the display.
(2) The display does not sometimes appear in the display panel when electric field is supplied.
(3) The initial state is too turbid to apply to the digital devices.

The cholesteric liquid crystall compounds are selected from carboxylic acid esters of cholesterol, sitosterol, stigmasterol and other sterol alcohols. The carboxylic acid moiety contains from about 10 to 30 carbon atoms and includes such saturated and unsaturated acids as capric, undecylenic, decanoic, myristic, palmitic, stearic, oleic, linoleic, linolenic, aracludic, behenic, erucic, cetoleic, brassidic, cerotic and the like.

The nematic liquid crystal compounds are selected from compounds of the formula

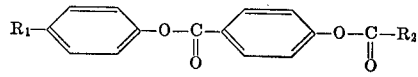

wherein $R_1$ and $R_2$ are alkyl or alkoxy groups which may be the same or different. The alkyl groups, including the alkyl portion of the alkoxy group, may be straight chained or branched and preferably contain from 1 to 12 carbon atoms. Such alkyl groups include methyl, ethyl, propyl, isopropyl, butyl, isobutyl, sec-butyl, tert-butyl, amyl, is-amyl, hexyl, 2-ethyl-hexyl, heptyl, octyl, nonyl, decyl, undecyl, dodecyl and the like.

The nematic liquid crystals where $R_2$ is alkyl may be readily obtained by reaction of a carboxylic acid chloride of the formula

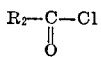

wherein $R_2$ is alkyl with a phenolic compound of the formula

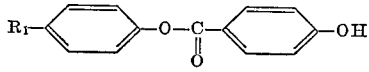

wherein $R_1$ is either alkyl or alkoxy.

The compounds wherein $R_2$ is alkoxy are obtained by the reaction of such phenolic compound with an alkyl chloroformate of the formula

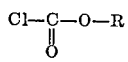

where R is an alkyl group containing from 1 to 12 carbons.

If desired, the carboxylic acid chloride or alkyl chloroformate is made to react with p-hydroxy benzoic acid to form a product of the formula

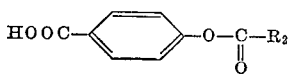

wherein $R_2$ is alkyl or alkoxyl. This acid is converted to its acid chloride and then made to react with a phenol of the formula

wherein $R_1$ is alkyl or alkoxyl, to give the desired end product. In Example 1 below, such procedure is described for the preparation of the compound in which $R_1$ is ethyl and $R_2$ is n-butoxyl.

The nematic liquid crystal content of the memory liquid crystal compositions of the present invention may contain one or more nematic liquid crystal compounds of the above formula. Preferably two such nematic liquid crystal compounds are used in the final compositions.

The invention will be more fully understood from the examples which follow. These examples are given only by way of illustration and are not to be considered as limiting.

Example 1

Synthesis of

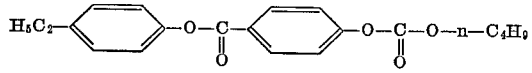

p-Hydroxybenzoic acid (1 mole) was dissolved in one liter of 2 M aqueous sodium hydroxide. To this mixture was added normal butyl chloroformate in slight excess under vigorous agitation at room temperature. The mixture was then acidified with acetic acid. Benzoic acid p-n-butyl carobnate was separated off, washed and dried. Thionyl chloride (1.2 moles) was added to the solid. After the reaction was completed, the excess thionyl chloride was removed. After cooling, p-ethylphenol (1 mole) and pyridine (1 mole) were added. The mixture was poured into 1. of water, and the solid ester which precipitate was recrystallized from ethanol.

Examples 2–4 illustrate the preparation of memory liquid crystals of the present invention.

Example 2

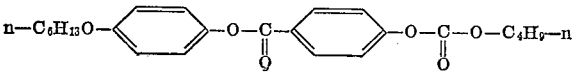

and 45 parts by weight of

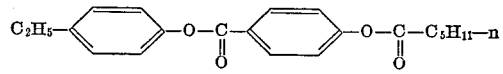

11 parts by weight of cholesteryl oleate were mixed. The liquid crystal product was stable at 6–58° C. This liquid crystal was sandwiched between transparent electrodes separated by a distance of 20 microns and 25 volts of direct current voltage were applied. The reflexibility for white color light was 25 percent as compared with that of magnesium carbonate. The display continued for more than three months after the discontinuance of the voltage supply without any practical reduction in reflexibility.

Example 3

62 parts by weight of

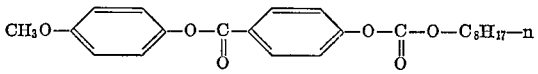

28 parts by weight of

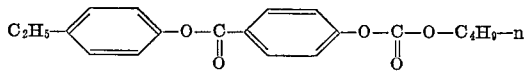

and 10 parts by weight of cholesteryl erudate were mixed. The liquid crystal product was stable at 8–57° C. This liquid crystal was sandwiched between transparent electrodes at a distance of 30 microns and 35 volts of direct current were applied. The reflexibility for whitecolor light was 20 percent as compared with that of magnesium carbonate. The display continued more than one month after the discontinuance of the voltage supply with several percent reduction of reflexibility.

Example 4

44 parts by weight of

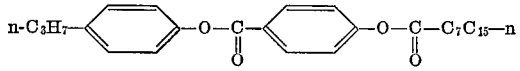

44 parts by weight of

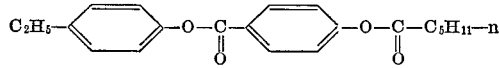

and 12 parts by weight of cholesteryl myristate were mixed. The liquid crystal product was stable at 12–58° C. This liquid crystal was sandwiched between the transparent electrodes at the distance of 25 microns, and 40 direct current volts were applied. The reflexibility for white color light was 22 percent as compared with that of magnesium carbonate. The display continued more than one month after the discontinuance of the voltage supply with several percent reduction of reflexibility.

In accordance with the procedures set forth in Examples 2–4 above the following additional compositions were prepared as set forth in Examples 5–10.

Example 5

89 parts by weight of

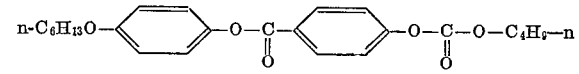

and 11 parts by weight of cholesteryl eructate.

Example 6

88 parts by weight of

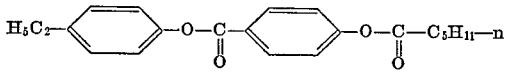

and 12 parts by weight of cholesteryl oleate.

Example 7

The composition of Example 2 was prepared except that cholesteryl oleate was replaced by sitosteryl oleate.

Example 8

The composition of Example 2 was prepared except that cholesteryl oleate was replaced by stigmasteryl oleate.

Example 9

The composition of Example 2 was prepared except that cholesteryl oleate was replaced by cholesteryl linoleate.

Example 10

The composition of Example 3 was prepared except that cholesteryl eructate was replaced by sitosteryl eructate.

The memory liquid crystal compositions of these examples were stable at room temperature and continued the light scattering without any appreciable reduction in its intensity for several months after the removal of the electric field.

What we claim and desire to secure by Letters Patent is:

1. A memory liquid crystal composition for electrical field orientation consisting of from about 80–95% by weight of at least one nematic liquid dynamic scattering crystal compound of the formula

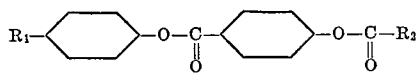

wherein $R_1$ and $R_2$ are alkyl or alkoxy containing from 1–12 carbon atoms and may be the same or different and from about 5–20% of a cholesteric crystal compound selected from the group consisting of carboxylic acid esters of cholesterol, sitosterol, and stigmasterol, the carboxylic acid moiety of said ester containing from 10 to 30 carbon atoms whereby said composition maintains its orientation after the orienting fields have been removed.

2. A composition according to claim 1, which contains from 80–95% of two nematic liquid crystal compounds.

3. A composition according to claim 2, wherein the cholesteric crystal compound is an ester of cholesterol.

4. A composition according to claim 3, which contains 44% by weight of

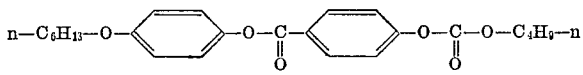

45% by weight of

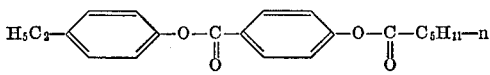

and 11% by weight of cholesteryl oleate.

5. A composition according to claim 3, which contains 62% by weight of

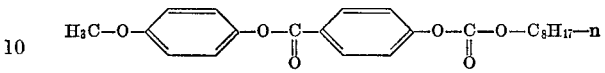

28% by weight of

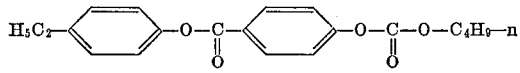

and 10% by weight of cholesteryl eructate.

6. A composition according to claim 3, which contains 44% by weight of

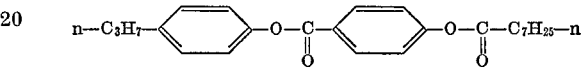

44% by weight of

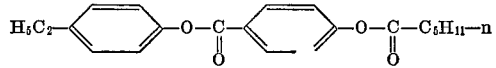

and 12% by weight of cholesteryl myristate.

References Cited

UNITED STATES PATENTS 3,650,603    3/1972    Heilmeier et al. _____ 350—160

OTHER REFERENCES

Usol'tseva et al., Chemical Characteristics, Structure and Properties of Liquid Crystal, Russian Chemical Reviews, vol. 32, No. 9, pp. 495–507, September 1963.

GEORGE F. LESMES, Primary Examiner

M. B. WITTENBERG, Assistant Examiner

U.S. Cl. X.R.

23—230 LC; 350—160 LC